F. B. MARVIN.
TRACTION MACHINE.
APPLICATION FILED MAR. 30, 1916.

1,251,553.

Patented Jan. 1, 1918.
2 SHEETS—SHEET 1.

WITNESS:
Wm Bell.

INVENTOR,
Frederick B. Marvin
BY
ATTORNEY.

F. B. MARVIN.
TRACTION MACHINE.
APPLICATION FILED MAR. 30, 1916.
1,251,553.
Patented Jan. 1, 1918.
2 SHEETS—SHEET 2.
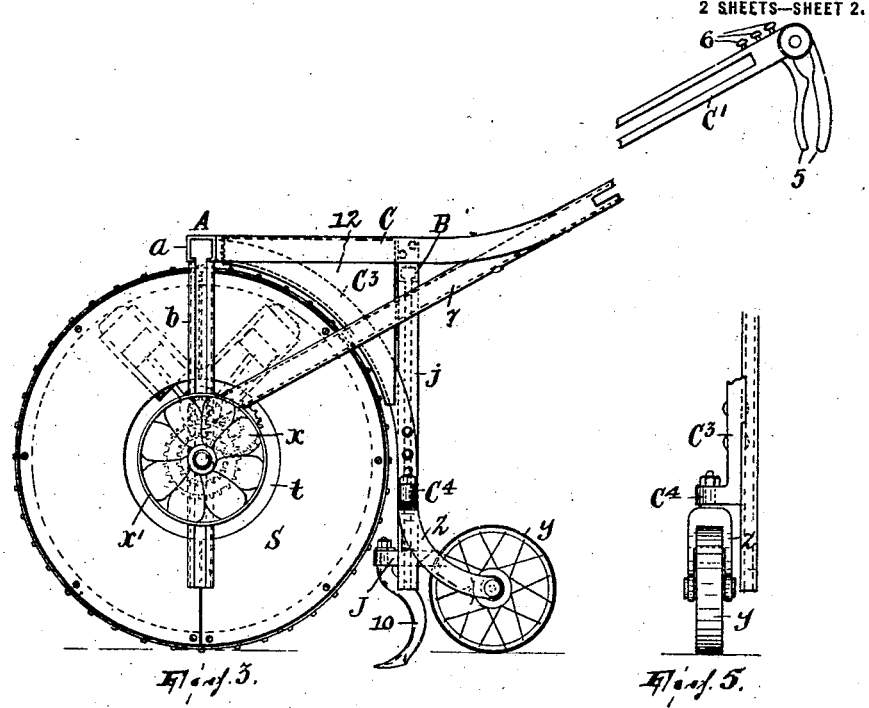
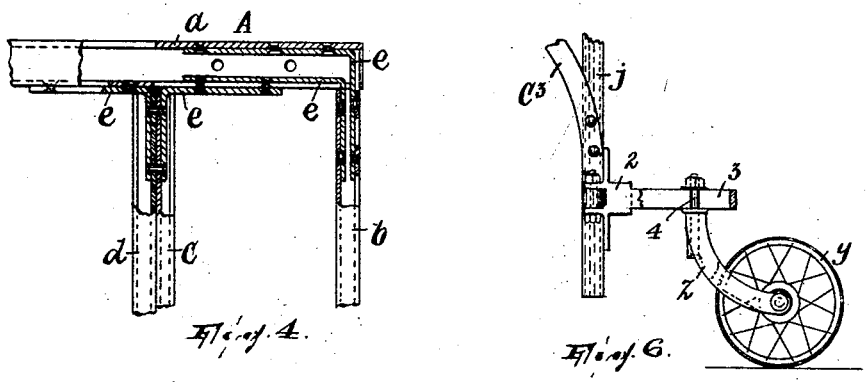
WITNESS:
Wm. D Bell.
INVENTOR,
Frederick B. Marvin.
By John Steward,
ATTORNEY

UNITED STATES PATENT OFFICE.

FREDERICK B. MARVIN, OF NEW YORK, N. Y.

TRACTION-MACHINE.

1,251,553.

Specification of Letters Patent. Patented Jan. 1, 1918.

Application filed March 30, 1916. Serial No. 87,714.

*To all whom it may concern:*

Be it known that I, FREDERICK B. MARVIN, a citizen of the United States, residing at New York city, in the county of New York and State of New York, have invented certain new and useful Improvements in Traction-Machines, of which the following is a specification.

My object by the present invention is to provide a self-driven traction machine that will be useful for a variety of purposes in connection with agricultural, garden and other out-door work, and at the same time will be durable, simple and light in construction and inexpensive to manufacture. Universality of usefulness being one of the prime objects of my invention, a principal feature is a novel form of frame which may be adapted to various purposes, as the supporting or carrying of various tools, implements, utensils and the like in operative position thereon, and adjustable laterally to change the width of the machine for breaking up or otherwise operating the ground or growth thereon in widths varying in extent, and for guidance by hand as the operator walks behind. Another feature of the invention consists in providing the frame with a bifurcated portion to receive a traction wheel, preferably driven by a motor arranged within the same, and with a part extending laterally of the bifurcated portion and affording a journal for an auxiliary wheel, preferably free to turn independently of the traction wheel thus to facilitate turning the machine about. Another feature consists in forming the traction wheel as a drum closed at all points except centrally on one side (preferably the outside) to permit access to the engine and admit air for cooling the engine forced into the traction wheel through the opening provided centrally therein as above indicated, the means for causing the inflow of air for cooling the engine being a rotary fan element which also serves as a belt wheel when the engine is to be employed, as when the machine is standing stationary, for driving some other machine or implement, for instance, a grind stone, a circular saw, etc. Still another feature is a novel construction and arrangement of a frame, a traction wheel, a laterally arranged auxiliary wheel and a trailer wheel, whereby a traction machine is produced that may be hand-guided with facility and turned about by ease and convenience.

In the accompanying drawings,

Fig. 3 is a side elevation;

Fig. 4 is a fragmentary sectional view of the bifurcated portion of the frame;

Fig. 5 is a rear elevation of a part of the frame and one of the traction wheels; and, Fig. 6 is a side elevation of a modified form of what is shown in Fig. 5.

Generally stated, the frame of the machine includes a forward upright structure in which the traction and auxiliary wheels are journaled concentric with an axle arranged in said structure, a rear upright structure which is suitably connected with the forward upright structure by members which in the present instance also afford handles for guiding the machine, and which carries means in which the cultivator or the like implements are supported, said structures, the means for supporting the cultivators and the axle all being extensible laterally. The forward and rear upright structures are for the most part composed of channel iron.

Figure 2:
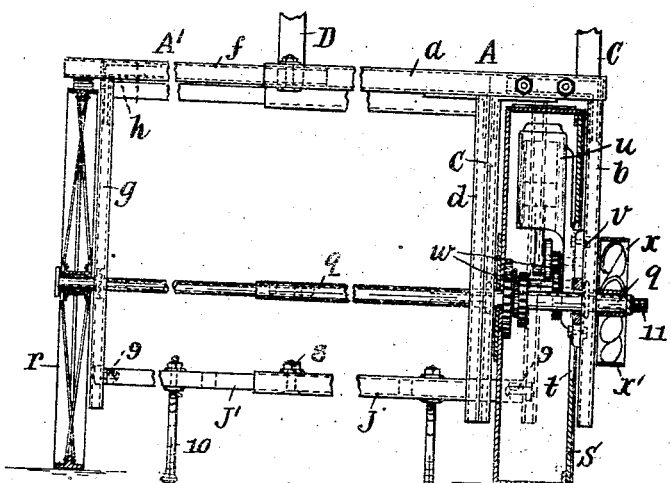
Fig. 2 is a front elevation thereof, partly in section.

The forward upright structure includes the rigid section A and the extension section A'. The section A is constructed as follows: $a$ is a horizontal piece of channel iron, having its channel opening downwardly, and $b$, $c$ and $d$ three vertical pieces of channel iron which are secured to the piece $a$ by the angle irons $e$ shown in Fig. 4 so that they depend perpendicularly from the piece $a$, the piece $b$ at the end of the piece $a$ and having its channel open outwardly and the pieces $c$ and $d$ back to back. The pieces $b$ and $c$ form with the piece $a$ a fork or bifurcated part of the frame. The section A' is thus constructed: $f$ is a horizontal piece of channel iron, having its channel open downwardly and $g$ is a vertical piece of channel iron which is secured to the piece $f$ near one end thereof by angle irons $h$, shown dotted in Fig. 2 but substantially like the angle irons $e$. The piece $f$ of the section A' fits into the piece $a$ of the section A, so that the two sections of the forward upright structure may be adjusted telescopically.

The rear upright structure includes the sections B and B'. The section B includes a horizontal piece of channel iron $i$, having its channel open downwardly, and a vertical piece of channel iron $j$ extending downwardly in perpendicular relation to the piece $i$ and having its channel open inwardly, the two pieces $i$ and $j$ being connected by a bolt $k$ which is carried in the end of the piece $i$ and has its head received by the channel of the piece $j$ and engaging opposite inwardly projecting flanges $l$ on piece $j$, this construction permitting the piece $i$ to be adjusted vertically with reference to piece $j$ and also to be removable. Section B' has its parts $m$, $n$, $o$ and $p$ respectively corresponding in construction and function to the parts $i$, $j$, $k$ and $l$. The piece $m$ of section B' is telescoped into piece $i$ of section B.

For connecting the front upright structure with the rear upright structure I provide the members C and D. D may be a suitable length of channel iron or its equivalent which at its forward end underlaps the telescoped portions of the sections A A' of the forward upright structure but which crosses over the telescoped portions of the rear upright structure, being secured to said structures where it intersects them by the bolts E and F, which penetrate slots G in the sections A A' and B B'. Member C also has generally the shape of a handle, the portion thereof C' constituting the handle proper having an inwardly projecting offset $C^2$ which is rigidly secured to the upright $j$, as by riveting or otherwise. Member C is bolted or otherwise rigidly secured to the back face of the piece $a$ of the section A, and formed preferably integral with it is a rearwardly projecting and downwardly curving extension $C^3$, whose lower end is bent off laterally, as at $C^4$. The handles may be braced at their rear ends by the cross-piece H. I is a rearwardly extending downwardly curved member corresponding to the extension $C^3$ and bolted or otherwise secured to the rear face of piece $n$ of section B'. Members $C^3$ and I are preferably riveted to the outer faces of the pieces $j$ and $n$, as best shown in Fig. 3.

A telescopic axle $q$ is arranged in the depending portions $b$, $c$, $d$ and $g$ of the forward upright structure, $q'$ being an extension thereof which is preferably capable of rotation independently of the portion $q$. On this axle outwardly of the piece $g$ of the forward upright structure is journaled the auxiliary wheel $r$, and with the axle as its axis of rotation there is arranged in the fork of the forward upright structure a traction wheel $s$ in the form of a hollow drum which is closed on the inside and also on the outside, so as to prevent dirt from working into it, excepting for the central hole $t$ in its outer wall. Contained in the traction wheel is a gasolene or other motor $u$ which is secured at $v$ to the piece $b$ of the forward upright structure and which has suitable connections $w$ for transmitting power therefrom to the axle and its extension $q'$. These being no part of the present invention, further description thereof is unnecessary excepting to say that preferably they are such that they will permit various speeds to be accomplished both with respect to the traction wheel $s$ and the axle extension $q'$. The latter carries a fan-wheel $x$, the fan portion of which will serve to cool the motor $u$ when it is of the internal combustion type, and the periphery $x'$ of which may serve both as a guard for the fan and a pulley to receive a belt for driving some other implement, as a rotary saw, grind stone, and the like.

The trailer wheels $y$ may be respectively journaled in forks $z$ which may be suitably pivoted to the members $C^3$ and I; in Figs. 3 and 5 the fork $z$ for the trailer wheel corresponding to the traction wheel $s$ is pivoted in the turned off end $C^4$ of the extension $C^3$ of handle C, but in Fig. 6 said fork is pivoted in a special bracket 2 bolted to said extension $C^3$, the bracket having a longitudinal slot 3 receiving the pivot 4 of the fork $z$ and thus permitting the latter to be adjusted forward and backward.

5 denotes grip pieces, one of which may be movable, for use in controlling certain of the connections $w$, and 6 denotes buttons for use in controlling the motor as for starting, sparking, etc.; the connections between said parts 5 and 6 and connections $w$ and the motor may be conducted through the housing 7 suitably attached to the frame.

It will be noted that the forward portion of the frame, formed by A A' and the forward portions of members C D', forms a horizontal rectangular support on which various implements or utensils may be conveniently carried.

Below the sections B B' there is arranged a horizontal support including the telescoped members J J' connected by a bolt or bolts 8 so as to be extensible telescopically, the same being secured to the pieces $d$ and $g$ of the frame, so as to be vertically adjustable therein or removable therefrom, by bolts 9 in substantially the same manner as the bolts $k$ and $o$ connect the sections B B' to said pieces $d$ and $g$. Members J J' are longitudinally slotted and in their slots receive the laterally adjustable cultivator tools 10 or other implements.

According to the usage to which the machine is to be put, one or both of the structures B B' and J J', may be adjusted vertically in the pieces $d$ and $g$ to any desired height, or removed entirely.

The free end of the axle extension $q'$ may be provided with a threaded nipple 11 for the attachment thereto of a flexible cable for driving the various implements of the class capable of being actuated through a connection of the flexible cable type.

Figure 1:
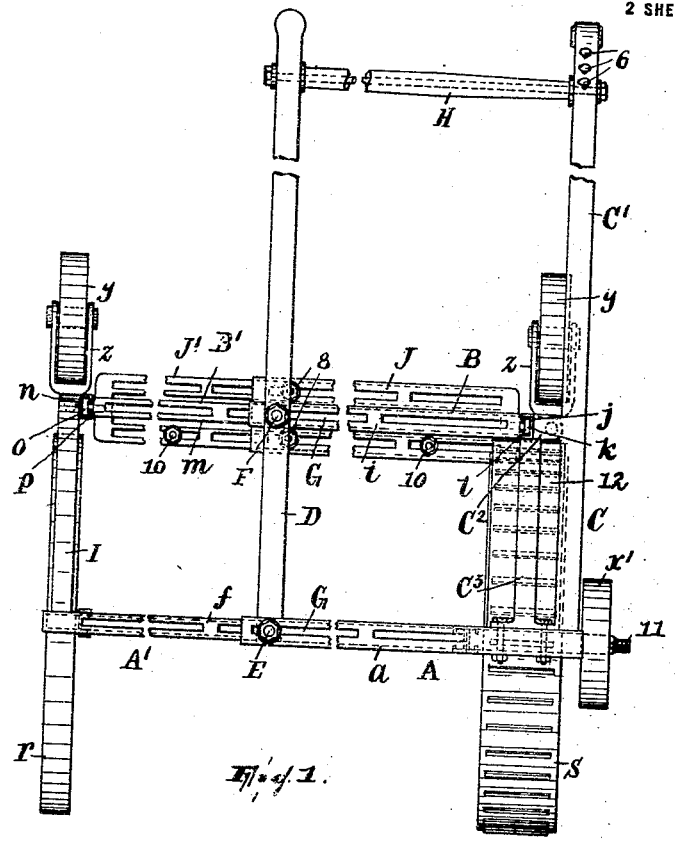
Figure 1 is a plan view of the traction machine, showing the same adapted for use as a cultivator.

A fuel supply tank for the engine is shown at 12 in Fig. 1.

The machine is peculiarly well adapted to be guided by hand from behind with ease and without tiring the operator because its center of turning to right or left is essentially the wheel s, which is not only the traction element but the wheel which principally sustains the load, and because wheel r rotates free of the motor and the trailer wheel is only incidentally concerned in supporting the load and is swiveled to the frame back of the tractor wheel s and on an upright pivot. The turning about, in cultivating or other work where the progress is back and forth in parallel courses, is obviously effected and with great facility and convenience; the machine, after one course is traversed, is swung about on the tractor wheel as a center, thus bringing the machine squarely in position to traverse the next course.

Having thus fully described my invention, what I claim as new and desire to secure by Letters Patent is:—

1. In a traction machine, the combination of a traction wheel, a frame in which the wheel is held to rotate in a single upright plane, said frame projecting rigid to the rear of the wheel, a motor on the frame operatively connected with the wheel, a trailer wheel pivotally connected to the frame behind the traction wheel to swivel on an upright pivot, and an auxiliary freely rotating wheel journaled in the frame beside the traction wheel, said frame affording back of the traction wheel means to grip and turn the machine about by hand.

2. In a traction machine, the combination of a traction wheel, a frame in which the wheel is held to rotate in a single upright plane, said frame projecting rigid to the rear of the wheel, a motor on the frame operatively connected with the wheel, a trailer wheel pivotally connected to the frame behind the traction wheel to swivel on an upright pivot, and an auxiliary freely rotating wheel journaled in the frame beside the traction wheel, said frame affording back of the traction wheel means to grip and turn the machine about by hand, the part of the frame in which the auxiliary wheel is journaled being laterally adjustable with reference to the part of said frame in which the traction wheel is journaled.

3. In combination, a frame including a bifurcated portion and having a part thereof extending laterally from said bifurcated portion and being laterally adjustable, a traction wheel journaled in said bifurcated portion of the frame, means to drive the traction wheel, and another wheel journaled beside the traction wheel in the laterally extending part of the frame.

4. In combination, a forward upright structure, a rearward upright structure, and means to rigidly connect said structures, a horizontal supporting means for parts to be carried by the machine adjustable vertically in the rearward structure, a traction wheel journaled in the forward structure and means, attached to the forward structure, for driving the traction wheel.

5. In combination, a forward upright structure, a rearward upright structure comprising upright spaced members, and a vertically adjustable supporting member connecting said members, means to rigidly connect said upright members with the forward structure, a traction wheel journaled in the forward structure and means, attached to the forward structure, for driving the traction wheel.

6. In combination, a frame, an axle therein, a hollow traction wheel journaled on the axle, said wheel having in one side a central opening penetrated by the axle, means, attached to the frame at and extending through said opening and arranged in said wheel, for driving the traction wheel.

7. In combination, a frame, a hollow traction wheel journaled therein, said wheel having in one side a central opening, an engine housed in the wheel and attached to the frame at said opening, a rotary fan arranged opposite said opening, and power transmitting connections between the engine and said wheel and fan.

8. In combination, a hollow traction wheel, a frame in which said wheel is journaled, an element to be rotated journaled coaxially with and projecting from said wheel, a motor in the wheel attached to the frame, and independent power transmitting connections between the motor and the wheel and said element.

In testimony whereof I affix my signature.

FREDERICK B. MARVIN.